(12) United States Patent
Kimura et al.

(10) Patent No.: US 11,688,296 B2
(45) Date of Patent: Jun. 27, 2023

(54) SYSTEM, SERVER, USER DEVICE INCLUDING A USER INTERFACE AND ROAD CONTROL DEVICE THAT ARE USED FOR TRAINING VEHICLE MAINTENANCE TECHNICIANS BY SIMULATING FAULTS IN THE ELECTRONIC COMMUNICATION SYSTEM OF THE VEHICLE (71) Applicant: KG Protech Limited, London (GB)

(72) Inventors: Antonio Setsuo Kimura, Jundiaí (BR); Cintia De Almeida Kimura, Jundiaí (BR); Georg Homolatsch, Jundiaí (BR)

(73) Assignee: KG Protech Limited, London (GB)

( * ) Notice: Subject to any disclaimer, the term of this patent is extended or adjusted under 35 U.S.C. 154(b) by 1193 days.

(21) Appl. No.: 16/319,208

(22) PCT Filed: Jul. 21, 2017

(86) PCT No.: PCT/BR2017/050206
§ 371 (c)(1),
(2) Date: Aug. 6, 2019

(87) PCT Pub. No.: WO2018/014104
PCT Pub. Date: Jan. 25, 2018

(65) Prior Publication Data
US 2020/0126442 A1 Apr. 23, 2020

(30) Foreign Application Priority Data

Jul. 21, 2016 (BR) .......................... 102016016946-1
Jul. 20, 2017 (BR) .......................... 102017015621-4

(51) Int. Cl.
*G06F 9/54* (2006.01)
*G09B 9/00* (2006.01)
(Continued)

(52) U.S. Cl.
CPC ............... *G09B 9/00* (2013.01); *G06F 9/547* (2013.01); *G06N 20/00* (2019.01); *G09B 19/0069* (2013.01)

(58) Field of Classification Search
CPC .... G06F 1/3206; G06F 11/1687; G06F 30/30; G06F 30/33; G06F 30/38
(Continued)

(56) References Cited

U.S. PATENT DOCUMENTS 5,147,206 A 9/1992 Golenski
7,200,543 B2* 4/2007 Palladino .............. G06F 11/261
714/E11.167

(Continued)

FOREIGN PATENT DOCUMENTS

CN 203397599 U 1/2014
CN 203706576 U 7/2014
(Continued)

OTHER PUBLICATIONS

PCT/BR2017/050206, Oct. 24, 2017, International Search Report and Written Opinion.
(Continued)

*Primary Examiner* — Andy Ho
(74) *Attorney, Agent, or Firm* — Wolf, Greenfield & Sacks, P.C.

(57) ABSTRACT

A fault simulation system, a server (100), a user device (200) comprising a user interface and a wire controller (300), intended for teaching and validating practical knowledge in the long-distance training of vehicle (500) maintenance personnel, allowing the emulation or simulation of faults by manipulating the signals of the electronic system of the vehicle (500). Some embodiments of the invention are developed with the purpose of simulating the most diverse defects in vehicles, acting, for example, in the injection
(Continued)

calculator module, air conditioning system, CAN bus system, dynamic stability control, ABS system, accelerator, speed governor, speed limiter, airbag system, fuel pump, gear selector lever, wiper nozzle, among others, enabling a highly realistic emulation of a fault scenario by manipulating the signals of the electronic communication system of the vehicle (500).

21 Claims, 8 Drawing Sheets

(51) Int. Cl.
    *G06N 20/00*    (2019.01)
    *G09B 19/00*    (2006.01)

(58) Field of Classification Search
    USPC .......................................... 703/13, 14, 16, 17
    See application file for complete search history.

(56) References Cited

U.S. PATENT DOCUMENTS

| | | | | |
|---|---|---|---|---|
| 9,349,227 | B2 * | 5/2016 | Julson | G01R 31/08 |
| 10,169,928 | B2 * | 1/2019 | Chen | G06F 30/20 |
| 11,087,633 | B2 * | 8/2021 | Delisle | H04L 67/10 |
| 2010/0100520 | A1 | 4/2010 | Dargue et al. | |
| 2012/0040316 | A1 | 2/2012 | Mathiowetz et al. | |
| 2012/0226486 | A1 | 9/2012 | Plocek | |

FOREIGN PATENT DOCUMENTS

| | | |
|---|---|---|
| CN | 204204234 U | 3/2015 |
| CN | 204315123 U | 5/2015 |
| CN | 204680242 U | 9/2015 |
| CN | 105788386 A | 7/2016 |
| CN | 106251761 A | 12/2016 |
| CN | 106448423 A | 2/2017 |

OTHER PUBLICATIONS

PCT/BR2017/050206, Nov. 1, 2018, International Preliminary Report on Patentability.
International Search Report and Written Opinion for International Application No. PCT/BR2017/050206 dated Oct. 24, 2017.
International Preliminary Report on Patentability for International Application No. PCT/BR2017/050206 dated Nov. 1, 2018.
[No Author Listed], Breakdown Boxes And Cable Harnesses—Road Transport And Agricultural Vehicle Applications. 2 pages. https://exxotest.com/en/produit/breakout-boxes-and-cable-harnesses-road-transport-and-agricultural-vehicle-applications/ [last accessed Mar. 6, 2019].
[No Author Listed], Breakdown Boxes And Interface Cable Harnesses—Light Vehicle Applications. 2 pages. https://exxotest.com/en/produit/breakout-boxes-and-interface-cable-harnesses-specific-vehicle-applications/ [last accessed Mar. 6, 2019].

* cited by examiner

SYSTEM, SERVER, USER DEVICE INCLUDING A USER INTERFACE AND ROAD CONTROL DEVICE THAT ARE USED FOR TRAINING VEHICLE MAINTENANCE TECHNICIANS BY SIMULATING FAULTS IN THE ELECTRONIC COMMUNICATION SYSTEM OF THE VEHICLE

CROSS-REFERENCE TO RELATED APPLICATIONS

This application is the National Stage of International Application No. PCT/BR2017/050206, filed Jul. 21, 2017 and entitled "SYSTEM, SERVER, USER DEVICE COMPRISING A USER INTERFACE, WIRE CONTROLLER DEDICATED TO THE TRAINING OF VEHICLE MAINTENANCE PERSONNEL BY MEANS OF FAULT SIMULATION IN THE ELECTRONIC COMMUNICATION SYSTEM OF THE VEHICLE," which is hereby incorporated herein by reference in its entirety. International Application No. PCT/BR2017/050206 claims priority to and the benefit of Brazilian Patent Application No. 10217015621-4, filed Jul. 20, 2017, which is hereby incorporated herein by reference in its entirety. International Application No. PCT/BR2017/050206 also claims priority to and the benefit of Brazilian Patent Application No. 10216016946-1, filed Jul. 21, 2016, which is hereby incorporated herein by reference in its entirety.

TECHNICAL FIELD

This application refers to a vehicle fault simulation system, server, user device comprising a user interface and wire controller, intended for teaching and validating practical knowledge in the long-distance training of vehicle maintenance personnel through an IoT architecture.

Thus, the system enables the remote or onsite emulation or simulation of faults by manipulating the signals of the electronic system of the vehicle, preferably between sensors or actuators and the different ECUs of the vehicle. The vehicles mentioned here are, for instance, cars, trucks, tractors, agricultural machinery, among others.

BACKGROUND

Vehicles consist of electrical and mechanical systems. The electrical system combines all the electrical components of the automotive vehicle and is divided into circuits, each with different basic functions and controls, for example, ignition circuit, starter circuit, battery charger circuit, lights circuits and ancillary circuits.

Due to time, wear and tear, the electrical system of vehicles may indicate a variety of problems. Teaching good practices for repairing these automotive problems is important to allow for a comprehensive training of maintenance personnel.

Traditionally, the whole training of automotive technicians used to be performed in person, however, this type of training generates high transportation, lodging and food costs.

For many dealerships, the high training costs have become prohibitive and, in many cases, they delay or even cancel the training of their technical experts, thus adversely affecting the quality of service.

In order to reduce training costs, many automakers have digitized training and implemented distance learning (ODL) tools over the past few years.

These ODL tools are mainly used to teach and evaluate theoretical knowledge; they are not useful for teaching and assessing practical knowledge.

The inventors have recognized short comings of traditional approaches. Current teaching techniques and methods and practical assessment are laborious for the instructor because they require the preparation of a test vehicle through the manipulation of electric wires or the implementation of defective parts.

The current techniques and methods of practical assessment do not provide an objective measure of the expertise of the assessed technician because the preparation of the test vehicle often leaves traces that are difficult to disguise, giving the assessed technician a strong indication of the correct answer (identification of the defect).

Currently, some onsite trainings make use of "Simulation Labs", as shown in the patent document US 2012/0226486. External individual reconstructions, often assembled on trailers, physically or functionally replicate different automotive systems, such as the engine system, brakes system, etc.

The inventors have recognized and appreciated that the major drawback of these "Simulation Labs" is that they are tailor made developments with no upgrade option, thus becoming obsolete with the progress of technology and vehicle models.

The "Simulation Labs" do not offer a holistic and complete training of practical knowledge because, since they focus on one system only, they are unable to demonstrate the repercussions and collateral damage of the fault in a specific system or other systems of the automotive vehicle.

Because of their size, these "Simulation Labs" cannot be easily transported. In addition, for being costly to produce, they are available in very few technical schools and training centers.

The patent document US 2012/0226486 consists of simulating the mechanical systems of Caterpillar engines dedicated to earth moving machines.

This device is a trailer that acts as a laboratory, which takes the mechanical parts of the vehicles for simulation.

The device also features software that can insert the defects manually or remotely without the training being interrupted. The inventors have recognized and appreciated that this solution is limited to mechanical defects, to the model of the machine to be used, requires the presence of an instructor and is dedicated to onsite training.

The prior art also involves the concept of similar practical situations in a real context with different tools and equipment specially prepared to teach and validate practical knowledge, such as teaching methods used in the aeronautical industry, in the military area, in the medical area, in the mining area and in the direction of loading machines. The inventors have recognized and appreciated that these practical simulation technologies make use of virtual reality and place the learner in a fictional and "protected" context to simulate fault scenarios—a much less realistic and effective teaching method.

Other prior art documents reveal vehicle fault simulation systems without, however, delving deeper into them as embodied in the present invention. The Chinese document CN204680242, published Sep. 30, 2015, reveals a vehicle fault simulation system, which includes a computer, a wireless sending module, a wireless receiving module, an electronic control unit (ECU) of a car, a relay module and a serial port controller. The inventors have recognized and appreciated that this system does not teach an alternative for the server to communicate with one or more wire controllers in parallel through an application programming interface (API).

Another Chinese patent document CN106448423, published Feb. 22, 2017, provides a training system with wireless remote control using the Internet of Things for the simulation of problems throughout the vehicle. This invention shows that the system comprises a desk stand and a panel cabinet. That is, the systems are removed from the vehicle, different from the current invention which uses the vehicle itself where wire controllers are connected. The invention of the prior art provides for a mock up, i.e., subsystems of the vehicle, as mentioned in the document, a vehicle engine system, an automatic transmission system, an automatic air conditioning system and a chassis system and does not show a system that uses the vehicle itself.

In addition, the invention includes a panel cabinet with an electrical schematic diagram of an external sensing terminal. The panel cabinet is connected with a wireless remote control terminal using Zigbee. There is also a computer, projector, driver, speaker, laser pointer and keyboard arranged in the mobile multimedia cabinet. The inventors have recognized and appreciated that such a disadvantageous invention of the prior art does not allow for distance education as taught in the present invention.

In view of the foregoing, the inventors have recognized and appreciated that currently none of the technologies available is appropriate for qualifying, training and validating practical knowledge in vehicles because they are unable to simulate at a distance through a digital protocol and web server the same faults that the vehicle shows in practice with a real malfunction in the vehicle itself.

The travel costs and the difficulty of simulating faults in a realistic way, leaving no traces of the defects make it difficult to train maintenance professionals of the most different types of vehicles. Therefore, the lack of adequate technological solutions for distance learning prevents the training of professional technicians in the automotive industry. Therefore, the present invention was developed in order to overcome the setbacks arising from the current techniques and methods.

Now, the present application reveals the solution for the technical difficulties encountered in the prior art.

BRIEF SUMMARY

In some embodiments, the present invention teaches a system dedicated to the training of vehicle maintenance personnel through fault simulation in the electronic communication system of the vehicle, where the signal traveling through a plurality of wires of at least one cable of a vehicle is intercepted in order to simulate a plurality of faults by means of a switching mechanism capable of diverting the signal coming from a vehicle wire to a circuit that produces a desired fault, whereas the commands for selecting the desired fault are alternatively transmitted by a wireless communication system.

In some embodiments, the system comprises the following elements: at least one server, at least one user device with an interface, capable of sending and receiving data through the server and at least one wire controller capable of receiving and sending data through the server.

In some embodiments, the server can communicate with one or more wire controllers in parallel through an application programming interface (API) and a Wi-Fi connection.

In some embodiments, the user device comprises at least one instructor application for the instructor's module and at least one learner application for the learner's module.

In some embodiments, the wire controller is further provided with connectors suitable for each type of vehicle connected to at least one point of the vehicle, receiving electrical signals from the wires, and being able to make modifications to the signals coming from the vehicle through a plurality of wire controllers, with at least one output of the controller being connected to cables and connectors which are connected to the vehicle.

In some embodiments, the server can communicate with one or more wire controllers to enable or disable faults on one or more wires, in addition to sending and receiving user information through the instructor module comprising an instructor application and a learner module comprising a learner application, with means for managing said users, with different access rights in parallel.

In some embodiments, the user device comprises a user interface with the possibility to perform at least: user registration, the organization of the training sessions and remote training sessions via conference call.

In some embodiments, the wire controller for the training of vehicle maintenance personnel through the simulation of failures in the electronic communication system of the vehicle comprises a switching mechanism capable of diverting the signal from a vehicle wire a circuit that produces a desired failure, whereas the commands to select the desired failure are alternatively transmitted by a wireless communication system, comprising a microcomputer which controls a plurality of wires through a plurality of wire control modules controlled by a bus (3042).

BRIEF DESCRIPTION OF DRAWINGS

In order to allow for a better understanding of the present invention, reference is made to the accompanying figures.

DETAILED DESCRIPTION

A vehicle fault simulation system was developed with the purpose of simulating the most diverse faults, anomalies, errors, irregularities and defects of light-duty and heavy-duty vehicles, acting, but not limited to, in the injection calculator module, air conditioning system, dynamic stability control, ABS system, accelerator, speed governor, speed limiter, airbag system, fuel pump, gear selector lever in the case of automatic transmission, wiper nozzle, rear lights, reversing light, among others, enabling a highly realistic emulation of a fault scenario by manipulating the signals of the electronic communication system of the vehicle.

In some embodiments, the purpose of such a system is to set up a realistic simulation of automotive faults in vehicles to enable distance training and practical assessments of automotive technicians in a practical and effective manner. In some embodiments, the invention also improves teaching even in onsite training, since during an assessment, the use of the invention does not allow the learner to figure out the defect of the vehicle through parts that seem to have been recently replaced. In some embodiments, the present invention significantly increases instructor productivity, as the instructor is now able to train and evaluate more technicians at the same time.

In some embodiments, such a system is able to intercept, temporarily and without a trace, different functions of an automotive vehicle to simulate faults without the need of an instructor.

In some embodiments, the signal traveling through a plurality of wires of a vehicle cable is intercepted by the wire controller so that it intentionally produces a variety of faults by manipulating the signal so that the vehicle computers (ECUs) interpret this signal as a fault that will be useful for the training of vehicle maintenance personnel. This interruption does not cause any modification to the vehicle, as it is sufficient to disconnect the socket from the cable originally connected to the vehicle and connect it to the wire controller. In turn, the wire controller returns the signal through its cable and socket which are identical to that of the vehicle. The wire controller may not make any modifications to the signals that will enter the cable wires and will be in the same position in the socket, in which case the vehicle will continue to operate normally, and no defect will be simulated. The wire controller may further promote some change in one or more wires of the cable, producing a simulated fault in the vehicle.

In some embodiments, the system may consist of one or more wire controllers. Each wire controller may connect to one or more different cables provided with special connectors for each type of vehicle in a plurality of points of the vehicle. The wire controllers can connect, for example, to the injection calculator, the ABS module, the vehicle dashboard.

In some embodiments, when connected, the wire controllers receive electrical signals from all wires connected to the input connectors, but not all wires are connected to the circuit boards. Some wires may go through the controllers without actually being controlled, that is, some wires may not be interesting to simulate defects. On the other hand, the wires are controlled by the circuit boards, the wire controller cuts the signal or changes the signal pattern to simulate the defect.

There are several features and advantages of the simulation system including, for example, Highly realistic simulation: connecting to the electronics of the vehicle and using its systems, the invention causes in the vehicle exactly the same symptoms it would have with a real malfunction, thus making the simulation as real as possible.

Non-invasive simulation: the invention simulates defects in a temporary and non-invasive manner, which avoids damage to the vehicle.

Universal application: the invention may be used with any make and vehicle.

Reliable training and assessment: the invention enables a transparent, objective and reliable method for teaching and validating practical knowledge.

Easy transportation, installation and use: the invention is compact and portable and can be easily transported or shipped, allowing access to quality training from anywhere.

Quick activation and deactivation of faults: with a single command on the device's keyboard or by means of a remote control on the Internet, a fault simulation is triggered. The simulation of faults using conventional methods could take several hours to be prepared.

Wide range of possible simulations: the invention can simulate an unlimited number of automotive failures within the vehicle's electrical system. In addition to the most common faults, which are simulated by means of short circuit with the positive and negative short circuits and open circuit of the wires, the invention allows for a number of fault customizations, such as the modification of the signal via Pulse Width Modulation (PWM). PWM allows the modification of the signal by means of pulse width deformation to simulate more sophisticated defects that require modifying the frequency or even distorting the signal. It is also possible to simulate faults by varying the resistance of one or more wires through one or more potentiometers.

Remote control of devices via server: The server can communicate with one or more wire controllers in parallel through an application programming interface (API) and a Wi-Fi connection. The combination of the system with video conference ensures greater quality in training, teaching and assessment, where the instructor and learner can communicate in a practical manner.

User interface: allows the registration of a user; the organization and scheduling of training sessions, which can be performed remotely via conference call; the management of one or more devices. The interface also allows a user to update, enable and disable configurations on multiple terminals in parallel. Through the interface, users can also enter vehicle chassis number, device number, and the number of the connector used.

Wire controller: the device is capable of receiving commands through a Wi-Fi receiver or an embedded keyboard. The commands define the simulation of defects by manipulating the electrical signal going through the wires. That is, it is possible to produce a short circuit to the positive or negative short circuit in the wire, open the circuit, in addition to receiving an input signal and produce an output signal similar to that of the input, but with the modulation changed. The command may further include the variation of the wire resistance to manipulate the signal power. These commands are received through the protocol that defines the wire, the fault, and the variable value of that fault, in the case of PWM and variable resistance. This device may have a plurality of cables and connectors to connect to a plurality of connectors of different vehicle makes and models.

Printed circuit boards: connected in parallel by means of a shared I2C shared I2C bus with preferential 7-bit address enabling the driver of the microcomputer to send the addressing commands and the board with the specific address will respond. This configuration makes it possible to have a large number of wires controlled in a simple manner, granting flexibility to the system. Thus, it is possible to control different types of terminals that vary depending on the vehicle type, make and model, since different vehicles have connectors with different numbers of wires.

The inventors have recognized and appreciated that, in the present invention, as an advantage, the server is able to communicate with the wire controllers through a digital protocol to enable and disable a mechanism causing failure in one or more wires. Due to the above protocol, the system of the present invention is able to control wire controllers with different characteristics, that is, each controller can have a different number of wires and fault mechanisms. Therefore, the implementation of the present invention is made possible in different vehicle types, makes and models (that have connectors with different numbers of wires). In addition, the system architecture of the present invention provides flexibility in future developments, where more fault mechanisms can be implemented according to the technological evolution of vehicles.

The inventors have recognized and appreciated that the invention taught here is then able to concentrate the instructions on a central server to enable or disable failures in wire management devices by managing more than a thousand devices with distinct configurations in parallel. Another advantage of the present invention is the ability to simulate more sophisticated defects by modifying the signal by modulating the pulse width modulation (PWM) or by modifying the output power. The number of failures that can be simulated with this system brings great accuracy and reality in the simulation of a wide variety of real defects.

The inventors have recognized and appreciated that the server used in the present invention provides flexibility in the training and interaction of the learner with the instructor and the digital protocol provides flexibility to the wire controller, which can be connected to different types, makes and models of vehicles.

In some embodiments, the present invention consists of a system made up of the following elements: one or more servers (100); at least one user device (200) containing a user interface, such as desktop, tablet or smartphone programs, at least one wire controller (300).

The server (100) is capable of communicating with one or more wire controllers (300) in parallel through an application programming interface (API) and a Wi-Fi connection, and may simulate various failures in the vehicle for the training of maintenance personnel. The user interface device (200) preferably has at least one instructor application installed on the instructor device (201) and at least one learner application installed on the learner device (202). The user interface is able to send and receive data through the server (100).

Each wire controller (300) is provided with connectors (3039) suitable for each type of vehicle (500) connected at different points of the vehicle (500), such as injection calculator, panel, among others.

When the connectors (3039) are turned on, one or more wire controllers (300) receive electrical signals from all the wires connected to the input connectors (3039), but only some of these wires are connected (controlled) by the microcontrollers (3041), the others go through the circuit boards without interference directly to the female output connectors (3039). That is, of the wires connected to the circuit boards (3037), only some have the control modules (3041) that cut the signal or change their pattern, the other boards do not intercept the signal, which go from the input to the output without interference in order to close the circuit.

The server (100) is able to communicate with one or more wire controllers (300) through a digital protocol to enable and disable faults in one or more wires, and may even trigger failure in one wire at a time or in multiple wires concomitantly. The types of failures caused in the wires, in order to simulate a plurality of defects, are, for example, opening the wire (or infinite impedance), insertion of parasitic resistance in the wire (or increased impedance), short circuit between wires (zero impedance between wires), low resistance between wires (low impedance between wires), inversion of signals (or change of polarity, direction, etc.), invariant signal, null signal, attenuated signal or amplified signal.

More elaborate failures that depend on changes in the amplitude or shape of the signal are achieved by means of a variable resistor and/or a pulse width modulator.

The server (100) of the present invention is capable of managing at least one thousand wire controllers (300) with distinct configurations in parallel. In addition, it has the ability to update and analyze system configurations remotely and instantaneously, and at the same time, manage at least one thousand users, and these users may have different access rights in parallel.

Figure 5:
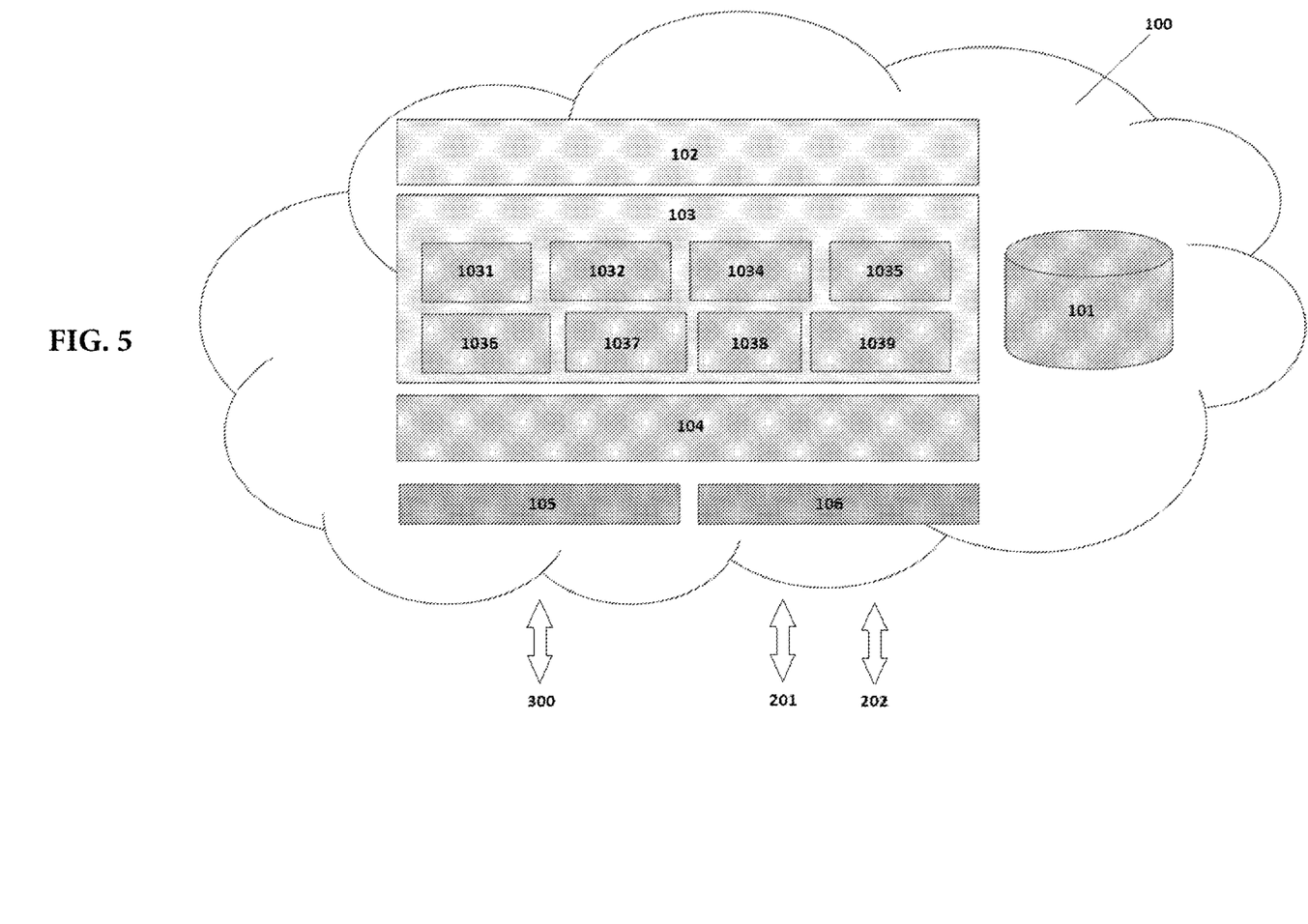
FIG. 5—Shows the server architecture (100) in detail.

FIG. 5 shows in more detail the server (100), which concentrates the information and sends and receives information from an instructor application (201) and a learner application (202).

The architecture of the present invention also allows the communication between the instructor device (201) and the learner device (202), advantageously promoting greater interactivity during the training. The server (100) also controls the wire controller (300) responsible for simulating the defects in the vehicle (500).

The server (100) has a database (101) for storing a variety of information, such as vehicle (500) models related to chassis and types of wires, learner and instructor data, access profiles, etc. The server is equipped with a controller (102), which regulates data traffic between devices and the access to courses, tests, fault simulation, etc. Therefore, both learner and instructor can have access to a series of features of the present system. The basic structures (103) are present on the server (100). The basic structures (103) comprise: the courses (1031), training (1032), tests (1034), faults (1035), instructor (1036), learner (1037), vehicle (1038), and wire controller (1039).

The server is equipped with an authentication routine (104), which performs secure authentication requests, such as login, permissions check and computes user access.

The server is equipped with a communication protocol (105) for the wire controller (300) and a protocol (106) for the users' applications.

Figure 6:
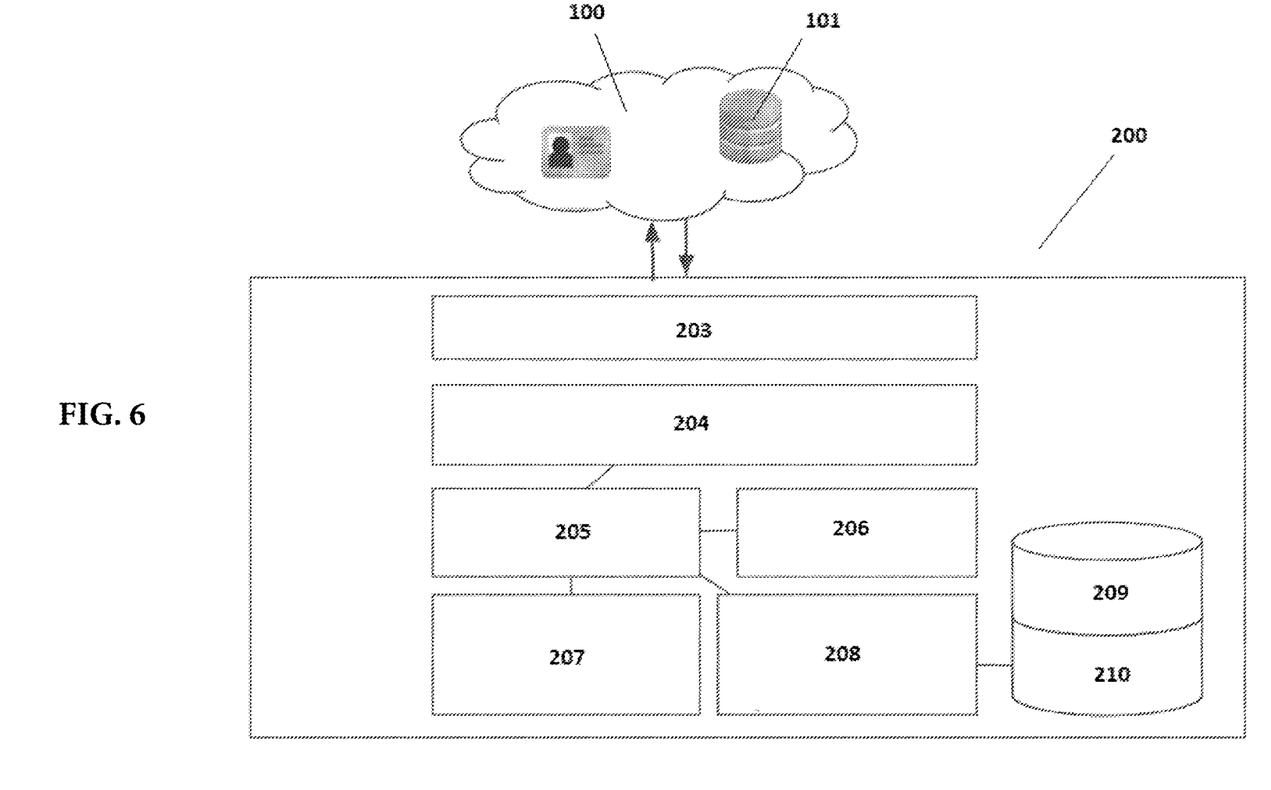
FIG. 6—Displays the user interface (200), which connects to the server (100).

The user device (200) comprising a user interface enables user registration, organization of training sessions, and remote training sessions via conference call. In addition, the user interface allows for the remote management of one or more wire controllers (300), performs user updates, enables and disables the configurations on several wire controllers (300) in parallel.

Among the functionalities of the user interface is the possibility for the users to enter the chassis number of the vehicle (500), the number of the wire controller (300) and the number of the connector (3039) in order to make sure that the device is plugged into the correct place in the vehicle.

In an embodiment of the invention it is possible to read the number of the connector (3039) used, the chassis number of the vehicles (500), the number of the wire controller (300) using a QR code. This QR code is a two-dimensional bar code that can be scanned using a camera. This camera could conveniently be, for example, the camera of a smartphone that has the user interface application installed. The QR code read by the camera is converted into information which includes the number of the connector used, the chassis number of the vehicles (500), the number of the wire controller (300), thus making the use of the system more user friendly.

The user interface also allows users to communicate with one or more users in parallel via video conference. FIG. 6 shows the user interface communicating with the server (100) by means of an application protocol (203). The present interface also comprises a synchronization server (204) that communicates with a controller (205), responsible for managing the basic structures (207), the graphical user interface (206) and the synchronization and connectivity routine (208) of the local database (210). The database (210) is equipped with a buffer (209).

The wire controller (300) comprises a small microcomputer (301), such as a Raspberry Pi, which is capable of receiving commands in the form of a digital protocol via Wi-Fi receiver or keyboard (3023). The wire controller (300) has one or more circuit boards (3037) for controlling one or more wires. The circuit boards (3037) receive and transmit one or more signals entering through the cable wires coming from the vehicle (500). Each circuit board has one or more wire controller modules (3041) that can process a digital protocol to control one or more circuit boards to enable and disable one or more faults, such as positive short circuit, negative short circuit, open circuit, variable resistance, pulse width modulation (PWM).

Figure 1:
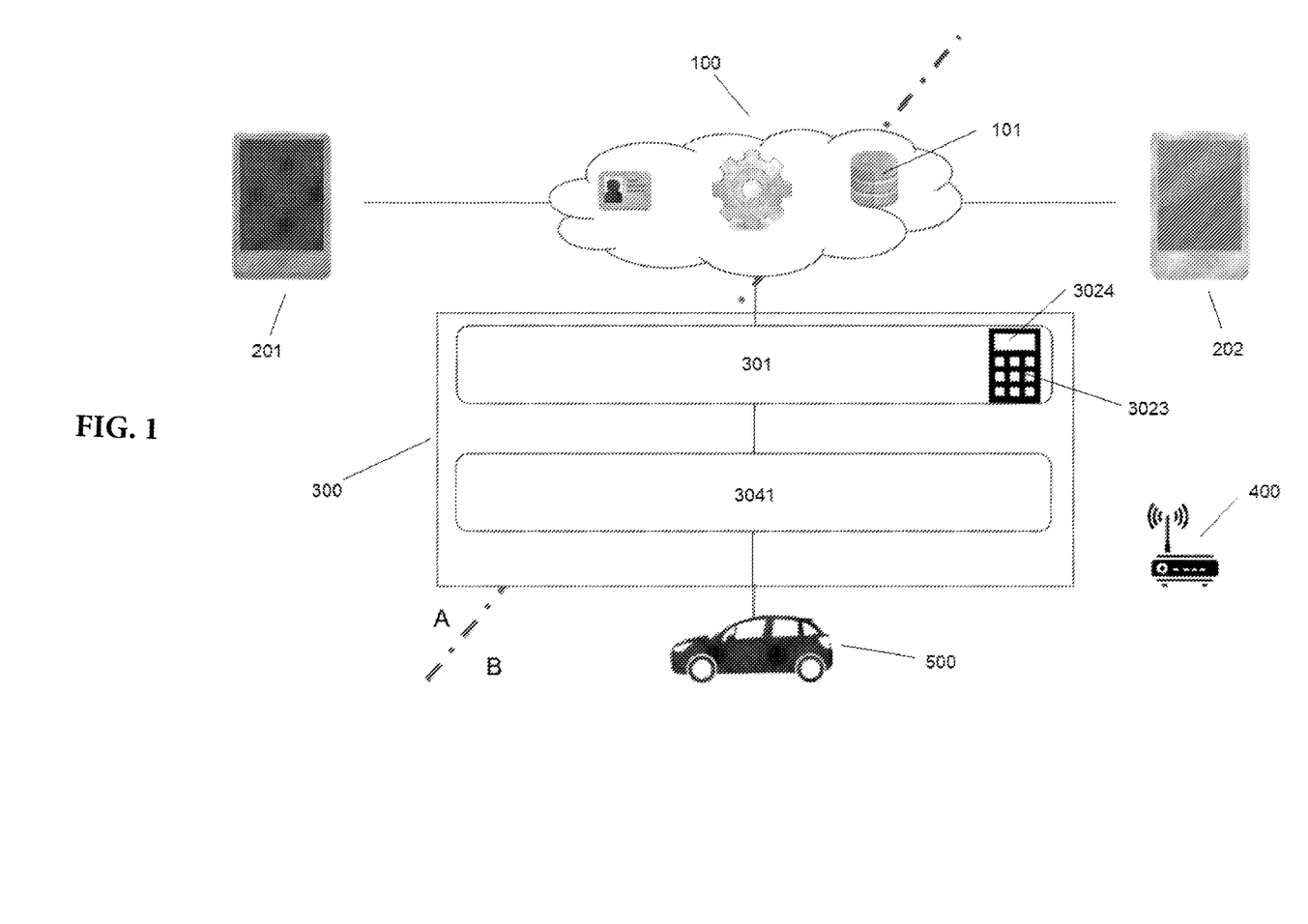
FIG. 1 shows the general low-level architecture of the system.
Figure 2:
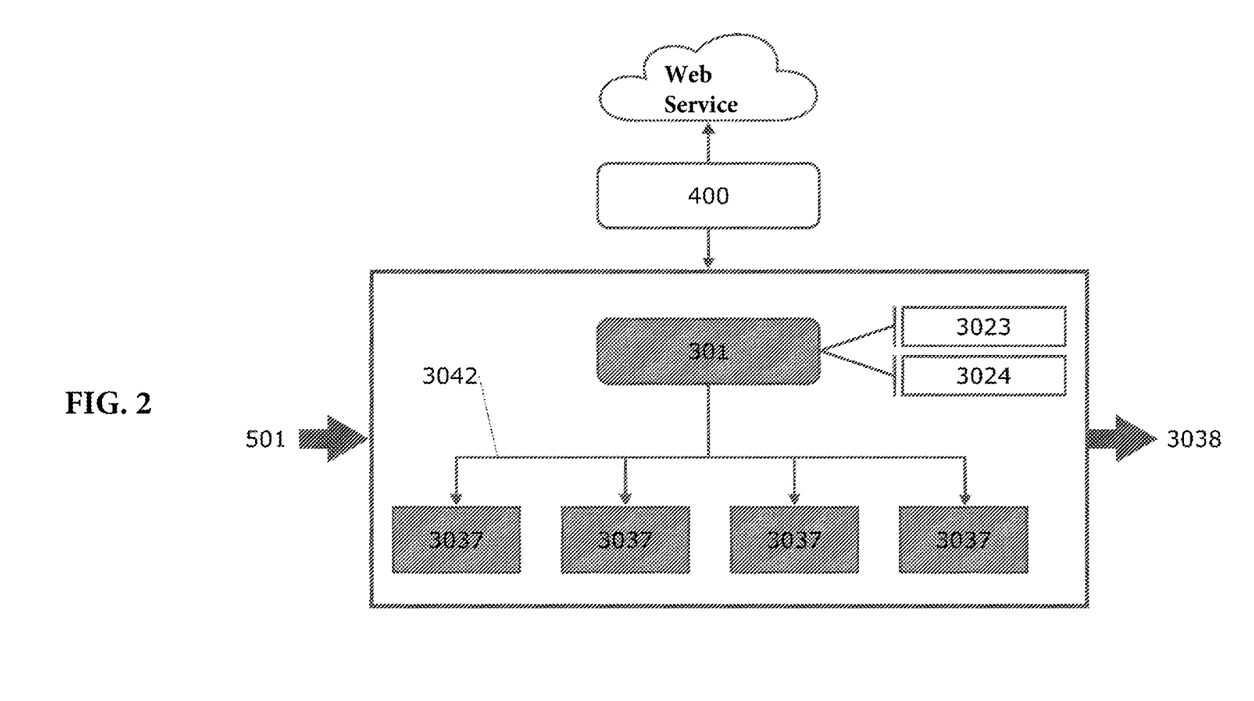
FIG. 2—shows the high-level architecture of the vehicle fault simulation system. This figure highlights the wire controller (300), where the wires (501) from the vehicle are connected to it. A microcomputer (301) receives instructions from a Wi-Fi router (400) which in turn is connected to a Web service. The microcomputer (301) may alternatively receive instructions from a keyboard (3023) located in the wire controller (300) itself and show information in a display (3024). The microcomputer (301) then controls the circuit boards (3037), which are connected by means of a shared I2C bus (3042), and control the wires returning to the vehicle (500) through cables (3038).
Figure 3:
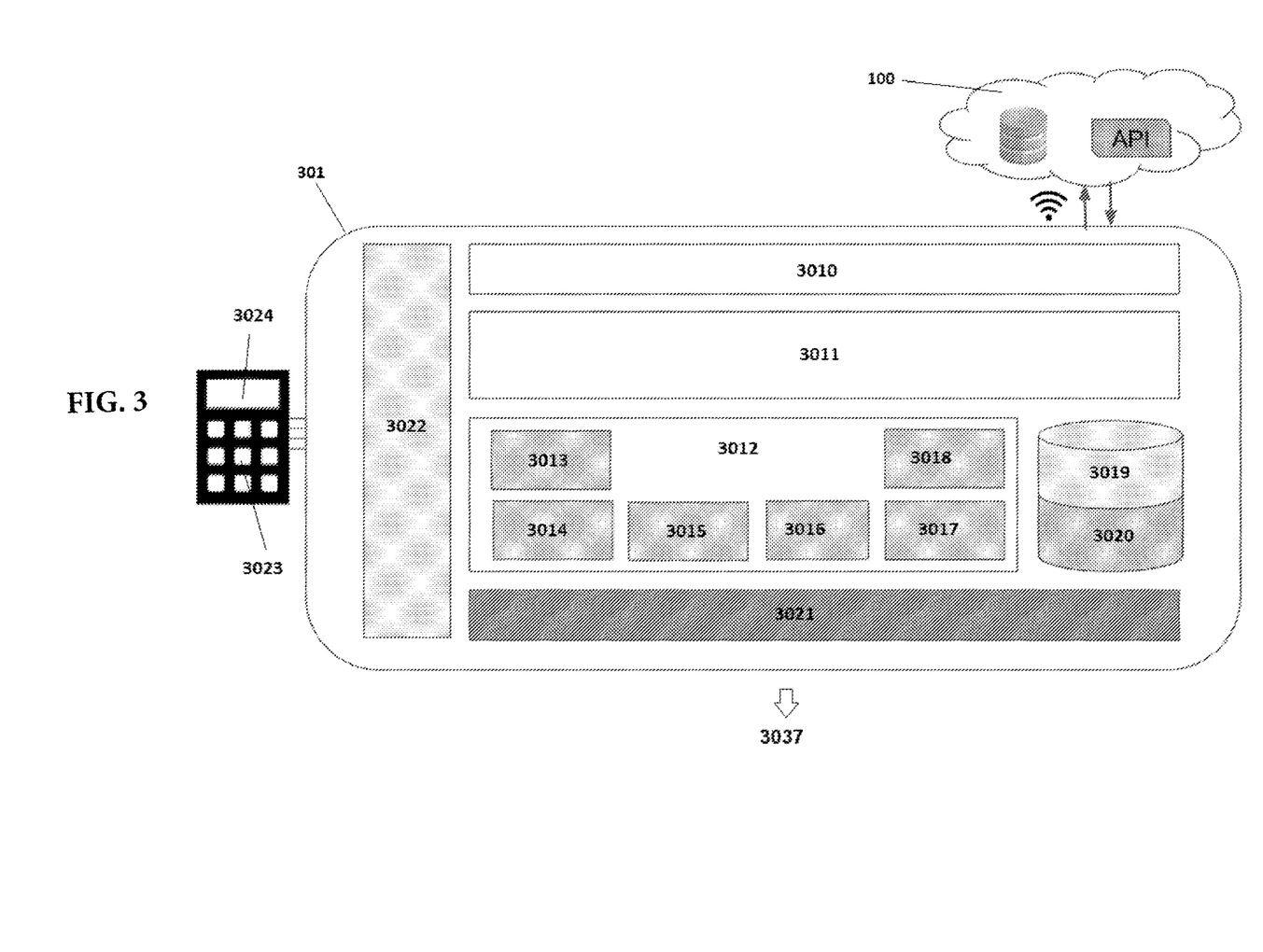
FIG. 3—shows the internal architecture of the microcomputer (301), which receives instructions from the server (100) and the keyboard (3023) and sends the information to the circuit boards (3037).
Figure 4:
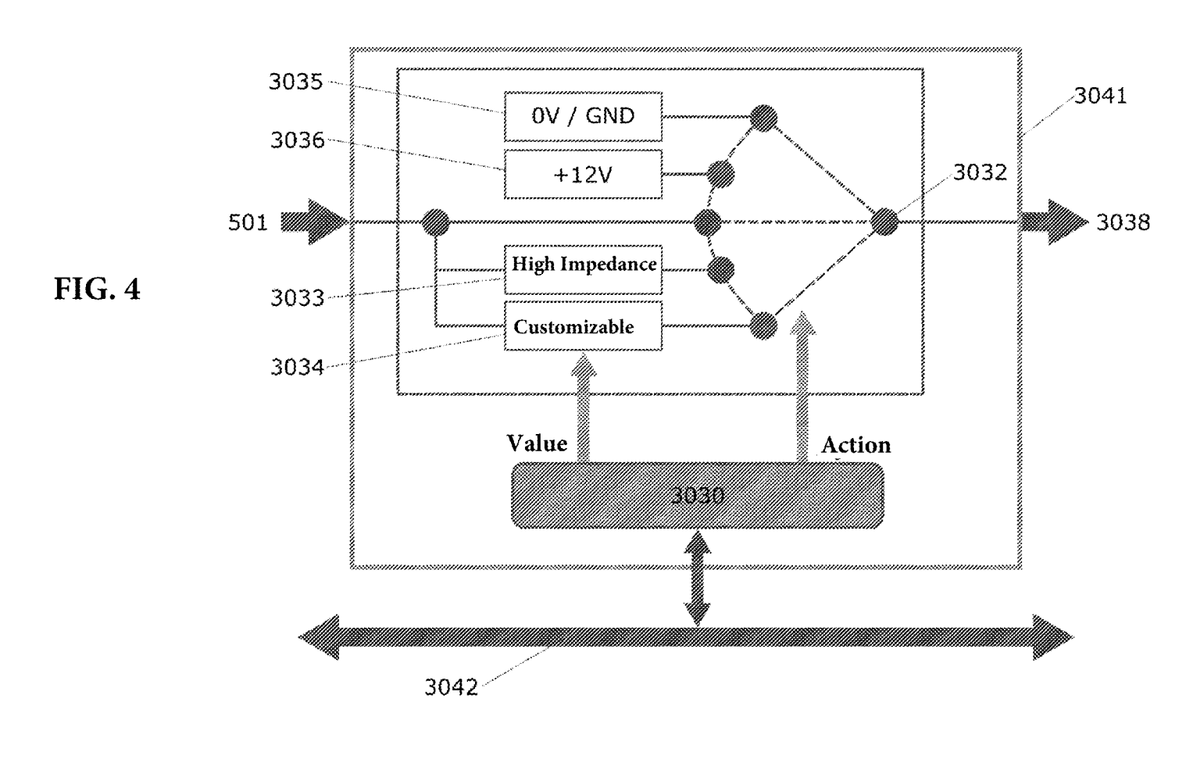
FIG. 4—Shows the high-level diagram of the wire control module (3041).

As shown in FIGS. 2 and 4, the circuit boards (3037) through the wire control modules (3041) are capable of producing a positive or negative short circuit, in addition to receiving an input signal and producing an output signal similar to the input signal with an altered modulation. The control modules (3041) have a switching mechanism (3032), such as a relay, to select the type of fault.

Thus, the switch can be selected in the customizable logic (3034) to, for example, vary a resistor in order to manipulate the power of an output signal. That is to say, to be even more specific, the signals coming in through the wires from the cables (501) of the vehicle (500) have their power changed by means of a potentiometer in order to deliver in the output a signal with lower power.

FIG. 4 shows an embodiment of the present invention. A switching mechanism (3032) can open the system to simulate a high impedance (3033). In this case no signal is transmitted through the wire. The signal from the wire may also be bypassed to make a short circuit (3035) or a direct connection to the positive being preferably 5V or 12V.

The wire control module (3041) may also provide for another customizable logic (3034) where the shape of the signal can be modified via pulse width modulation (PWM) by changing the shape of the signal. The switching mechanism (3032) may also be positioned to promote direct connection of the signal to the output, thus not promoting any defect simulation in the specific wire.

As shown in FIG. 2, the microcomputer (301) may receive commands both through the Wi-Fi router (400) and the keyboard (3023). The microcomputer controls the circuit boards (3037) through a shared I2C bus (3042) with a preferential 7-bit addressing enabling the connection of 112 circuit boards (3037) in parallel.

This architecture allows a large number of wire control modules (3041) that can be configured by a microcomputer (301). The microcontroller (3030) manages the fault configuration in each wire control module (3041). The wire control modules (3041) are accommodated in the circuit boards (3037).

The driver (3052) on the microcomputer (301) will send the addressing command and only the circuit board (3037) with the given address will respond. At this point, the bus (3042) is allocated, establishing a communication between the microcomputer (301) and the selected circuit board (3037) until another circuit board (3037) is selected.

A microcontroller (3030) is responsible for controlling the "actions" and "values" on each of the wires. The microcomputer (301), through the driver (3052), will establish communication with the microcontroller (3030) over the I2C protocol, where each microcontroller (3030) will be configured with a different 7-bit address. Thus, all the commands and controls will be sent to the microcontroller (3030) through the driver (3052) enabling the control from the initial state, initialization tests, change of "actions" and "values", as well as real-time reading of the state of each of the wires.

The address of each circuit board (3037) will be configurable, that is, it will not be necessary to change the firmware to define a new address for each circuit board (3037), allowing the exchange of circuit boards (3037) and possible exchanges for maintenance.

Figure 7:
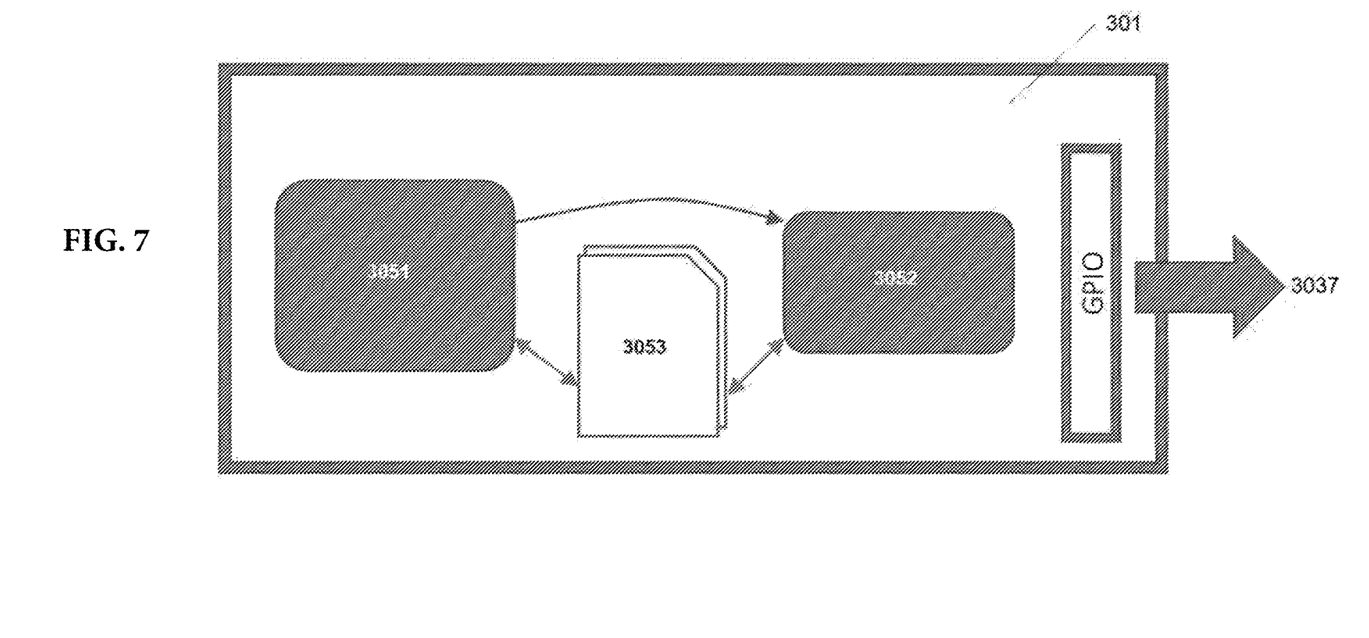
FIG. 7—Shows the operating architecture of the software of the microcomputer (301)

The microcomputer (301) communicates with the circuit boards (3037) using the compilation GPIO pins as shown in FIG. 7. The configurations of the wire controller (300) are defined by means of a remote web service that is accessible in a secure way through the microcomputer (301).

The wires in each controller (300) need to be properly configured in the learner session. The configurations of the controller (300) in the learner session should alternatively be defined globally by the instructor using a custom web application.

In another embodiment of the invention, the learner application allows stand-alone training where the learner is able to control the fault simulations on the devices and learn without the aid of the instructor.

The microcomputer (301) in each controller (300) can access the web-based configuration through a REST API. The controller (300) may also be configured onsite using a USB keyboard (3023) and integrated display (3024).

The advantages of this architecture are scalability, where you can have a large number of wires controlled. In addition, the circuit boards (3037) are simple and inexpensive and can be customized.

The circuit boards (3037) consist of a dedicated hardware responsible for setting up one or more wires. Thus, each circuit board (3037) preferably has several wire control modules (3041). In turn, each wire control module (3041) has a microcontroller (3030) and a switching mechanism (3032), which selects the direct passage of the signal or simulates a fault, such as an opening of the circuit (3033), a customizable logic (3034), such as PWM simulation or variable resistance, a short circuit with the ground (3035), a short circuit with the positive (3036).

Each of the wire control modules (3041) is interconnected through a bus (3042) which transmits a configuration signal to each of the wire control modules (3041). Depending on the code passed on that bus, the switching mechanism (3032) and the customizable logic (3034) assume states to simulate a defect in the wire or let the signal pass through it without modification.

As shown in FIG. 4, the wire control modules (3041) have a microcontroller (3030) which defines an "action" code for each fault simulated in the wire and a "value" which is optional and only works when the customizable logic is used. Both "action" and "value" are integer numeric values.

Thus, the "action" defines a type of fault to be simulated, as exemplified in a particular embodiment in the table below.

| Action | Type of Fault |
|---|---|
| 0 | Indicates that the wire has not yet been configured |
| 1 | The signal goes directly through the wire. Therefore, there are no simulated faults in the wire |
| 2 | Short circuit with the ground |
| 3 | Short circuit with the positive |
| 4 | High impedance (open circuit) |
| 5 | Customizable. Enables the custom logic hardware in the module, such as a PWM or potentiometer. If there is no custom logic in the module, the direct passage of the signal through the wire will be implemented (action 1 of the table) |

In addition to the "action", the wire control modules (3041) may accept an optional parameter called "value". The value is required for custom logic. This "value" should represent a percentage instead of an absolute amount. The value will be ignored by the circuits that do not use custom logic, such as: short circuit to ground or positive and open circuit, but they must still be present in order to activate the programmable logic.

The use of this simple approach with the definition of an "action" and "value" allows a scalable implementation, where the physical characteristics of each control module (3041) may change depending on the individual requirements of each vehicle manufacturer (500), without affecting the software architecture. Thus, other additional "actions" may be inserted in the future to accommodate the simulation of faults not described in the present invention. Thus, the defects described here constitute only a preferred embodiment of the invention.

Pulse width modulation (PWM) can be implemented in custom logic by integrating a microcontroller, such as an Arduino or Atmel. When action "5" is active, the input signal, coming from the vehicle, is routed to the appropriate pin of the microcontroller and then a new signal is reconstructed with a ratio of the new cycles defined by the "value" code.

Likewise, the resistance change can be performed using a potentiometer programmable in the custom logic, where the "action" defines the custom logic and the "value" defines the resistance chosen between a set interval. Alternatively, in order to reduce costs, resistances with predefined values can also be introduced instead of the potentiometer. In this case, there is not such a large resolution of resistance values, in contrast, the production cost is quite low, which may be adequate when it is not necessary to have a large variation of resistance values.

As an example, the following cases can be mentioned:
The "action" number zero redefines the module to its default undefined configuration.

The "action" number 2 with a "value" of 50% will instruct the circuit to perform a short circuit with the ground (3035). The "value" in this case will be ignored because it is not relevant.

The "action" number 5 with a value of 75% will activate the customizable logic (3034) in the wire controller module (3041). If the custom logic is pulse width modulation, the cycle must be set to 75%. If the customizable logic (3034) is of variable resistance from 1 KΩ to 20 KΩ, the embedded custom logic potentiometer must be set to 15 KΩ by the device.

As five possible actions, it is possible to code them using three bits.

| Action | Coding | Description |
|---|---|---|
| 0 | 000 | Default setting, meaning an action has not yet been assigned |
| 1 | 001 | Closed circuit. There are no faults on this wire |
| 2 | 010 | Short circuit with the ground |
| 3 | 011 | Short circuit with the positive |
| 4 | 100 | High impedance - open circuit |
| 5 | 101 | Custom action |

By using three bits, two other states 6 (110) and 7 (111) are reserved for future "actions", that is, two states are reserved for potential future uses or resources currently not described in this preferred embodiment.

The first three bits of the shift register are now assigned to the "action" code.

In order to store the "value", the recommendation is that it should be of at least 7 bits for a reasonable number of states.

In the preferred embodiment of the invention, a circuit board (3037) may contain one or more wire control modules (3041). Thus, it is possible to build a wire controller (300) containing circuit boards (3037) with each one being able to house a different number of wire control modules (3041).

In an embodiment of the invention, it is possible that most of the wires do not require custom logic, so a single circuit board may preferably contain from 6 to 12 wire control modules (3041). In the circuit boards (3041) with custom wire control modules (3041), one to two wire control modules (3041) will be preferably housed in said circuit board (3037). However, some wires may conduct higher currents, such as 10 Amps, in which case a single circuit board (3037) will house a smaller number of wire control modules (3041).

The microcomputer (301) has two main tasks: management of devices through an application (3051) and sending the "action" and "value" to the microcontroller (3030) through a drive (3052). The management application (3051) is then responsible for retrieving the instructor and/or learner configuration details, while the drive of the microcomputer (3052) communicates with the circuit boards through the GPIO pins on the microcomputer (301).

As shown in FIG. 7, the device management applications (3051) and the drive (3052) of the microcomputer (301) communicate using text files (3053) stored on the microcomputer's (301) disk. In a first step, the device management application (3051) must acquire instructor configuration information. The configuration instructions may come from a remote web server (100) or a locally connected keyboard (3023). In a second step, the firmware required to configure the circuit boards (3037) of the wire control module (3041) must be implemented. The applications are independent and will communicate using text files (3053) stored in the memory of the microcomputer (301).

In an embodiment of the invention, when the microcomputer (301) is started, it automatically connects to the appropriate wireless network and initiates a background process that will continuously search the Web service to obtain configuration update instructions.

In another embodiment of the invention, a touch screen display (3024) is used by the user to connect the device to a Wi-Fi network available onsite.

The microcomputer (301) also monitors the keyboard (3023) on a constant basis to accept instructions defined onsite in the wire controller (300). When new instructions are available, they will be written in a file preferably in the CSV format and the firmware program will be enabled to update the circuit boards (3037) of the wire controller (300). The CSV file preferably has three columns: wire number, "action" and "value". Thus, a wire controller (300) that controls 64 wires should have 64 lines in the CVS file.

The management application (3051) will create a status file after completing the update and this will be reported back to the Web server (100) so that the instructor/learner knows that the wire controller (300) is configured correctly for the test procedure. The management application (3051) will be written as executable preferably in the C or Python programming language.

The drive (3052) will need to know the physical specifications of the wire controller (300), such as the number of wires and whether or not the wires have customizable logic (3034). This information will be defined in a preferably read-only configuration file that is created in the manufacture of the wire controller (300).

When the drive (3052) is loaded, it first reads the configuration file and then the CVS file with the wire number, "action" and "value". Then, the drive (3052) will code the "actions" and "values".

If there is no CVS file, the drive (3052) will reset all wires to the default setting, which is "action" 0 and "value" 0. The drive (3052) will create a status file preferably in the "txt" format after updating the settings of the wire so that the software is informed whether the process was successful. The status file will contain details of an unsuccessful setup update, which may happen if the connection between the circuit boards (3037) is defective or broken. The microcomputer (301) must report back to the instructor if the setup process fails.

Due to the foregoing, the wire controller (300) may have a variety of cables (3038) and connectors (3039) for connection with the most different types of vehicles (500). In addition, the controller also has a battery attached to an embodiment of the invention.

The connectors (3039) are applied depending on the point of connection in the vehicle (500) and the number of connections required to enter and exit the wire controller (300).

The battery powers the system and keeps it powered up all the time in order to keep the circuits powered, so that during a probable circuit measurement, when the system is off, the response is equivalent to the activated command.

Figure 8:
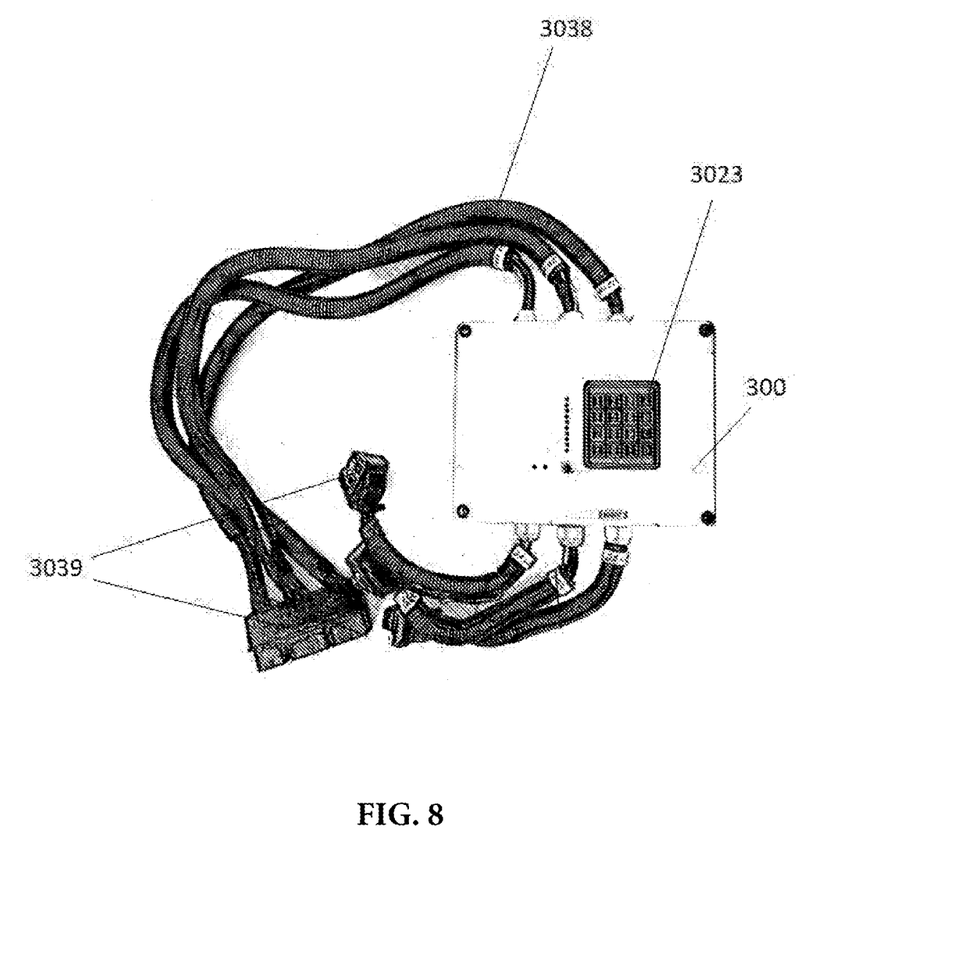
FIG. 8—Illustrative perspective view of a wire controller (300) sample.

Examples: A wire controller (300), as shown in FIG. 8, is provided with an enclosure, preferably made of polycarbonate with UV protection; one 12V to 48V power supply and one USB jack; a keyboard for access to the system, cables (3038) and male input connectors and female output connectors for connection with a vehicle (500).

The invention claimed is:

1. A system dedicated to the training of vehicle maintenance personnel through fault simulation in an electronic communication system of a vehicle, where a signal traveling through a plurality of wires of at least one cable of the vehicle is intercepted in order to simulate a plurality of faults using a switching mechanism capable of diverting the signal coming from a vehicle wire to a circuit that produces a desired fault, whereas commands for selecting the desired fault are alternatively transmitted by a wireless communication system, the system comprising:
at least one server,
at least one user device provided with an interface capable of sending and receiving data through the server, and
at least one wire controller; wherein:
the server is capable of communicating with one or more wire controllers in parallel through an application programming interface and a wireless connection;
the user device comprises at least one instructor application for an instructor device and/or at least one learner application for a learner device; and
the wire controller is further provided with connectors suitable for each type of vehicle connected to at least one point of the vehicle, receiving electrical signals from the wires and making modifications to the signals from the vehicle through a plurality of wire control modules, with at least one output of the wire controller connected to cables and connectors that are connected to the vehicle.

2. The system dedicated to the training of vehicle maintenance personnel through fault simulation in the electronic communication system of the vehicle, according to claim 1, wherein the server is configured to communicate via the wireless connection with one or more wire controllers for enabling or disabling faults in one or more wires.

3. The system dedicated to the training of vehicle maintenance personnel through fault simulation in the electronic communication system of the vehicle, according to claim 2, wherein the server is configured to enable a fault on one wire at a time and to enable faults in multiple wires concomitantly.

4. The system dedicated to the training of vehicle maintenance personnel through fault simulation in the electronic communication system of the vehicle, according to claim 1, wherein the faults simulated in the wires comprise one or more of: opening the wire, insertion of a parasitic resistance in the wire, short circuit between wires, low resistance between wires, inverse signals, invariant signal, null signal, attenuated signal, amplified signal, and pulse width modulated signal.

5. The system dedicated to the training of vehicle maintenance personnel through fault simulation in the electronic communication system of the vehicle, according to claim 1, wherein the server is configured to update and analyze the system configurations remotely and instantaneously and manage users with different access rights in parallel.

6. The system dedicated to the training of vehicle maintenance personnel through fault simulation in the electronic communication system of the vehicle, according to claim 1, wherein the user device comprising a user interface allows one or more of: user registration, the organization of the training sessions, and remote training sessions via conference call.

7. The system dedicated to the training of vehicle maintenance personnel through fault simulation in the electronic communication system of the vehicle, according to claim 1, wherein the user device communicates with the server via an application protocol, wherein the user device further comprises a synchronization server which communicates with a controller configured for managing the basic structures, a graphical user interface, and a synchronization and connectivity routine of a local database.

8. The system dedicated to the training of vehicle maintenance personnel through fault simulation in the electronic communication system of the vehicle, according to claim 1, wherein the wire controller comprises a microcomputer which is able to receive the commands in the form of a digital protocol via a wireless receiver or keyboard.

9. The system dedicated to the training of vehicle maintenance personnel through fault simulation in the electronic communication system of the vehicle, according to claim 1, wherein the wire controller has one or more circuit boards, wherein the circuit boards receive and transmit one or more signals from/to the vehicle through the one or more wires, each circuit board having one or more microcontrollers configured to process a digital protocol for controlling one or more wire control modules to enable and disable one or more faults in the wires.

10. The system dedicated to the training of vehicle maintenance personnel through fault simulation in the electronic communication system of the vehicle, according to claim 1, wherein the microcomputer is configured to access a remote web service for defining configurations of the wire controller.

11. The system dedicated to the training of vehicle maintenance personnel through fault simulation in the electronic communication system of the vehicle, according to claim 1, wherein the wires in each wire controller are configured in a learner session, and the configurations of the wire controller in the learner session are defined globally by an instructor using a web application.

12. The system dedicated to the training of vehicle maintenance personnel through fault simulation in the electronic communication system of the vehicle, according to claim 1, wherein the wires in each wire controller are configured in a learner session, with its own application and training in an independent way, where, alternatively, automatic simulations with audio-visual content are also available in the learner application.

13. A server dedicated to the training of vehicle maintenance personnel through fault simulation in an electronic communication system of a vehicle, wherein the server communicates with one or more wire controllers to enable or disable faults in one or more wires, said faults enabled in the wires comprise: opening the wire or an insertion of parasitic resistance in the wire or short-circuit between the wires or low resistance between the wires or reversing signals or invariant signal or null signal or attenuated signal or amplified signal or pulse-width modulated signal, said server sends and receives user information via instructor device comprising an instructor application and a learner device comprising a learner application, and said server is configured to manage users with different access rights in parallel.

14. The server dedicated to the training of vehicle maintenance personnel through fault simulation in the electronic communication system of the vehicle, according to claim 13, wherein the server is configured to enable communication between the instructor device and the learner device.

15. The server dedicated to the training of vehicle maintenance personnel through fault simulation in the electronic communication system of the vehicle, according to claim 13, wherein the server comprises a database for storing at least information about models of the vehicle, learner and instructor data and their respective access profiles.

16. The server dedicated to the training of vehicle maintenance personnel through fault simulation in the electronic communication system of the vehicle, according to claim 13, wherein the server is equipped with a controller, which regulates data traffic between devices and the access of at least one of the following: courses, training, tests, faults, instructor, learner, vehicle, and wire controller.

17. The server dedicated to the training of vehicle maintenance personnel through fault simulation in the electronic communication system of the vehicle, according to claim 13, wherein the server is configured for performing an authentication routine, which performs secure authentication requests, such as login, permissions check, and computes user access.

18. The server dedicated to the training of vehicle maintenance personnel through fault simulation in the electronic communication system of the vehicle, according to claim 13, wherein the server comprises a communication protocol for the wire controller and a protocol for user applications, where the communication protocol allows for the inclusion of future fault mechanisms and the management of wire controllers with different characteristics.

19. A wire controller dedicated to the training of vehicle maintenance personnel through fault simulation in an electronic communication system of a vehicle performed through a switching mechanism capable of diverting a signal coming from a wire of the vehicle to a circuit that produces a desired fault, whereas commands for selecting the desired fault are transmitted by a wireless communication system, the wire controller comprising:
a plurality of wire control modules configured to control a plurality of wires of the vehicle, the plurality of wire control modules comprising customizable logic for the simulation of a plurality of faults, wherein the customizable logic is configured to implement the faults by the modification of the signal by pulse width modulation and the modification of the signal by a variable resistance; and
a microcomputer configured to control the plurality of wire control modules.

20. The wire controller dedicated to the training of vehicle maintenance personnel, according to claim 19, wherein the microcomputer is configured to access a remote web service for configuring the wire controller.

21. The wire controller dedicated to the training of vehicle maintenance personnel, according to claim 19, wherein the microcomputer is coupled to a keyboard for configuring the wire controller.

* * * * *